United States Patent
Marra et al.

(10) Patent No.: US 10,270,723 B2
(45) Date of Patent: Apr. 23, 2019

(54) SYSTEMS AND METHODS FOR PROVIDING UNREAD CONTENT ITEMS FROM SPECIFIED ENTITIES

(71) Applicant: Facebook, Inc., Menlo Park, CA (US)

(72) Inventors: Gregory Matthew Marra, San Francisco, CA (US); Michael Novati, San Francisco, CA (US); Zhiqiu Kong, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 238 days.

(21) Appl. No.: 14/665,973

(22) Filed: Mar. 23, 2015

(65) Prior Publication Data
US 2016/0286002 A1   Sep. 29, 2016

(51) Int. Cl.
*H04L 12/58* (2006.01)
*G06Q 50/00* (2012.01)

(52) U.S. Cl.
CPC ............. *H04L 51/12* (2013.01); *G06Q 50/01* (2013.01); *H04L 51/32* (2013.01)

(58) Field of Classification Search
CPC ................................ H04L 51/12; H04L 51/32
See application file for complete search history.

(56) References Cited

U.S. PATENT DOCUMENTS

| | | | | |
|---|---|---|---|---|
| 7,720,916 B2 * | 5/2010 | Fisher | .................. | G06Q 10/107 704/4 |
| 2012/0110085 A1 * | 5/2012 | Malik | .................... | G06Q 10/00 709/205 |
| 2014/0040368 A1 * | 2/2014 | Janssens | ............... | H04L 67/306 709/204 |
| 2014/0172875 A1 * | 6/2014 | Rubinstein | ........ | G06F 17/30867 707/748 |
| 2014/0324984 A1 * | 10/2014 | Chang | ..................... | H04L 51/32 709/206 |
| 2014/0337361 A1 * | 11/2014 | Gailis | ............... | G06F 17/30867 707/752 |

* cited by examiner

*Primary Examiner* — Esther B. Henderson
(74) *Attorney, Agent, or Firm* — Fenwick & West LLP

(57) ABSTRACT

Systems, methods, and non-transitory computer-readable media can acquire a specified set of one or more entities associated with a user of a social networking system. A collection of content items provided by the specified set of one or more entities can be detected. One or more content items that are unread by the user can be identified out of the collection of content items. The one or more content items unread by the user can be sorted, in a chronological order, to produce a sorted set of one or more unread content items. An interface can be provided to the user for accessing the sorted set of one or more unread content items.

20 Claims, 10 Drawing Sheets

650

```
┌─────────────────────────────────────────────────────────────────────────┐
│ Determine that at least one content item in the sorted set is read by the user │
│                                    652                                  │
└─────────────────────────────────────────────────────────────────────────┘
                                     │
                                     ▼
┌─────────────────────────────────────────────────────────────────────────┐
│   Remove, from the sorted set, the at least one content item read by the user │
│                                    654                                  │
└─────────────────────────────────────────────────────────────────────────┘
                                     │
                                     ▼
┌─────────────────────────────────────────────────────────────────────────┐
│ Update the interface for accessing the sorted set without the at least one content item read │
│                                by the user                              │
│                                    656                                  │
└─────────────────────────────────────────────────────────────────────────┘
```

FIGURE 6B

SYSTEMS AND METHODS FOR PROVIDING UNREAD CONTENT ITEMS FROM SPECIFIED ENTITIES

FIELD OF THE INVENTION

The present technology relates to the field of providing content. More particularly, the present technology relates to techniques for providing unread content items from specified entities.

BACKGROUND

Today, people often utilize computing devices (or systems) for a wide variety of purposes. Users can use their computing devices to, for example, interact with one another, create content, share information, and access information. In some instances, a user of a computing device can utilize a social networking system (or service) to post, publish, share, or otherwise provide content, such as text, images, or videos.

In some cases, large amounts of content can be posted to the social networking system. In one example, a particular user of the social networking system can be presented with a multitude of content items provided from various posters or other sources. Under conventional approaches to providing content, it can often times be difficult or inconvenient for the particular user to sift through the multitude of content items to locate certain content items that may be especially relevant or interesting to the particular user. Furthermore, in accordance with conventional approaches, it can be inefficient and time-consuming for the particular user to locate those content items that he or she desires to access, view, or read. As such, conventional approaches can be inconvenient, inefficient, and costly. Due to these and other reasons, conventional approaches can create challenges for or reduce the overall user experience associated with utilizing social networking systems to access provided content.

SUMMARY

Various embodiments of the present disclosure can include systems, methods, and non-transitory computer readable media configured to acquire a specified set of one or more entities associated with a user of a social networking system. A collection of content items provided by the specified set of one or more entities can be detected. One or more content items that are unread by the user can be identified out of the collection of content items. The one or more content items unread by the user can be sorted, in a chronological order, to produce a sorted set of one or more unread content items. An interface can be provided to the user for accessing the sorted set of one or more unread content items.

In an embodiment, at least one new content item provided by at least one entity in the specified set can be detected. It can be determined that the at least one new content item provided by the at least one entity is unread by the user. The at least one new content item unread by the user can be incorporated into the sorted set based on the chronological order. The interface for accessing the sorted set incorporating the at least one new content item unread by the user can be updated.

In an embodiment, it can be determined that at least one content item in the sorted set is read by the user. The at least one content item read by the user can be removed from the sorted set. The interface for accessing the sorted set without the at least one content item read by the user can be updated.

In an embodiment, prior to determining that the at least one content item in the sorted set is read by the user, the at least one content item can be presented via at least one of the interface or a feed of the social networking system.

In an embodiment, determining that the at least one content item in the sorted set is read by the user can include detecting a trigger event. The trigger event can be associated with at least one of an action performed by the user with respect to the at least one content item or a minimum amount of time that has elapsed during which at least a threshold portion of the at least one content item is presented to the user.

In an embodiment, the action performed by the user with respect to the at least one content item can include at least one of a like, a comment, a share, a save, a hide, a delete, a tag, an edit, a click, a tap, a mouse action, or a mark-as-read action.

In an embodiment, one or more undesirable unread content items can be filtered out from the sorted set prior to providing the interface to the user for accessing the sorted set.

In an embodiment, subsequent to filtering out the one or more undesirable unread content items, the sorted set can include at least one of an image, a video, an audio, a link, an article, a status update, or text explicitly posted by an entity in the specified set.

In an embodiment, at least one of an approximation or an exact value for a quantity of the one or more unread content items in the sorted set can be determined. A counter indicating the at least one of the approximation or the exact value can be provided.

In an embodiment, the specified set of entities can include a set of close friends of the user or a list of entities manually defined by the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 6B illustrates an example method associated with providing unread content items from specified entities, according to an embodiment of the present disclosure.

Figure 1:
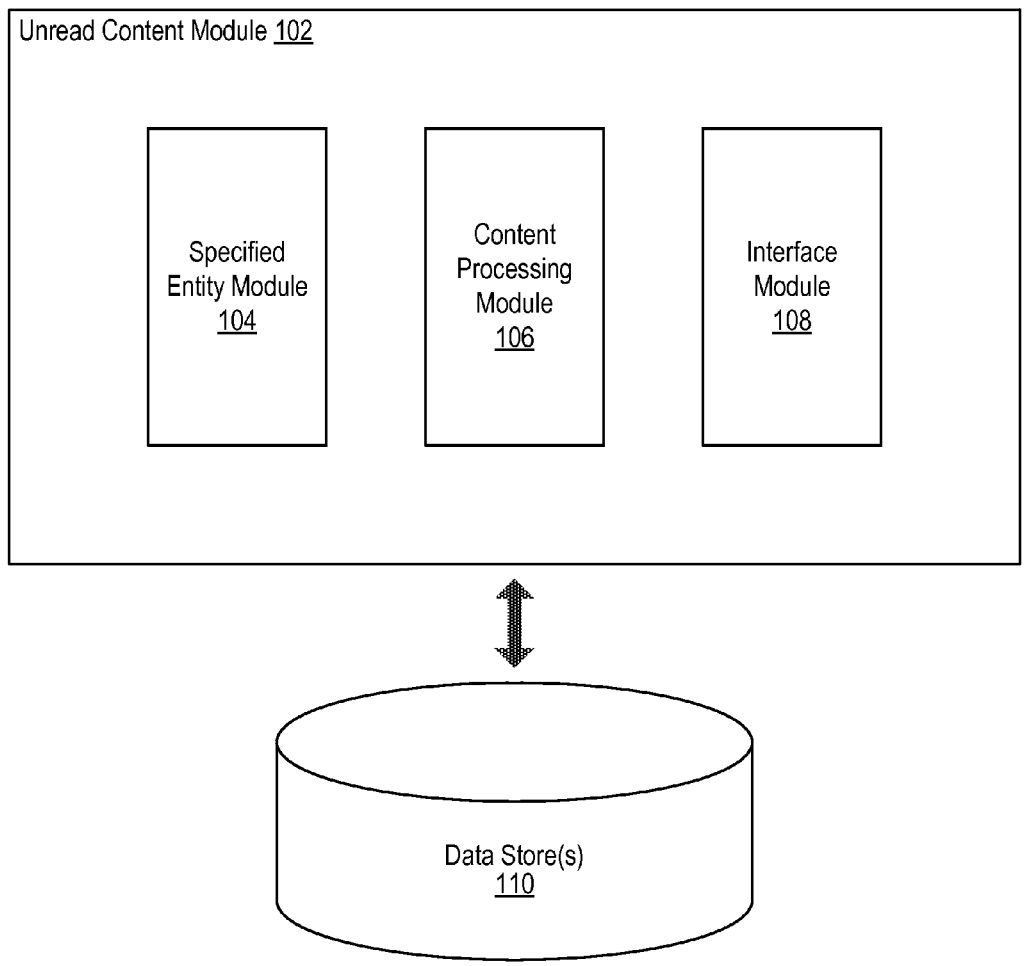
FIG. 1 illustrates an example system including an example unread content module configured to facilitate providing unread content items from specified entities, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Unread Content Items from Specified Entities

People use computing devices (or systems) for a wide variety of purposes. Computing devices can provide different kinds of functionality. Users can utilize their computing devices to produce information, access information, and share information. In some instances, users of computing devices can access a social networking system (or service) to establish connections, communicate, and interact with one another via the social networking system. Users can also provide, edit, share, or access content items such as text, notes, status updates, links, pictures, videos, and audio. In one example, a user (or entity) of the social networking system can post or publish a content item, which can be provided or presented on a profile page, such as on the user's timeline or on another user's timeline. In another example, the content item can be provided or presented through a feed, such as a newsfeed, for the user or for another user to view and access.

In some cases, the social networking system can have a large quantity of users (or entities), which can result in a large amount of content being posted, published, or provided. Often times, in accordance with conventional approaches, a multitude of content items can be provided, presented, or surfaced to a particular user of the social networking system, such as via a feed customized for the particular user. However, under conventional approaches, if the particular user is interested in certain content items, it can be inconvenient or difficult for the particular user to locate those content items within the multitude of content items provided to him or her. Moreover, some content items that may be of interest to the particular user can be time-sensitive, in that those content items may be relevant or interesting to the particular user only within a particular duration of time. Yet with conventional approaches, it can be challenging for the particular user to locate those content items within the duration of time.

As such, conventional approaches can be inconvenient, inefficient, and/or costly. Therefore, an improved approach can be beneficial for addressing or alleviating various concerns associated with conventional approaches. The disclosed technology can provide unread content items from specified entities. Various embodiments of the present disclosure can acquire a specified set of one or more entities associated with a user of a social networking system. A collection of content items provided by the specified set of one or more entities can be detected. One or more content items that are unread by the user can be identified out of the collection of content items. The one or more content items unread by the user can be sorted, in a chronological order, to produce a sorted set of one or more unread content items. An interface can be provided to the user for accessing the sorted set of one or more unread content items. It is contemplated that there can be many variations and/or other possibilities.

FIG. 1 illustrates an example system 100 including an example unread content module 102 configured to facilitate providing unread content items from specified entities, according to an embodiment of the present disclosure. As shown in the example of FIG. 1, the unread content module 102 can include a specified entity module 104, a content processing module 106, and an interface module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the unread content module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the unread content module 102 can be implemented, in part or in whole, as software running on one or more computing devices or systems, such as on a user or client computing device. For example, the unread content module 102 or at least a portion thereof can be implemented as or within an application (e.g., app), a program, or an applet, etc., running on a user computing device or a client computing system, such as the user device 710 of FIG. 7. In another example, the unread content module 102 or at least a portion thereof can be implemented using one or more computing devices or systems that include one or more servers, such as network servers or cloud servers. In some instances, the unread content module 102 can, in part or in whole, be implemented within or configured to operate in conjunction with a social networking system (or service), such as the social networking system 730 of FIG. 7. It should be understood that there can be many variations or other possibilities.

The specified entity module 104 can be configured to facilitate acquiring a specified set of one or more entities associated with a user of the social networking system. In some cases, the specified set of one or more entities can include a set of close friends of the user (or social connections that have at least a particular threshold social affinity or coefficient level with respect to the user within the social networking system). For instance, the social networking system can utilize social data to determine which users or entities qualify as close friends of the user. In some cases, the specified set of one or more entities can include a list of entities manually defined by the user. For example, the user can manually define who the user's close friends are. In another example, the user can manually specify which users or entities are to be included in the specified set of one or more entities. Accordingly, the user can specify, choose, select, or indicate the set of one or more entities (e.g., friends, social connections, etc.) from whom the user desires to read (e.g., view, access, engage with, etc.) content. It should be understood that many variations are possible.

The content processing module 106 can be configured to perform various tasks or operations associated with handling or otherwise processing content items, such as images, videos, audio, text, links, articles, and/or other posts within the social networking system. In some embodiments, the content processing module 106 can be configured to facilitate detecting a collection of content items posted, published, shared, or otherwise provided by the specified set of one or more entities. The content processing module 106 can also be configured to facilitate identifying, out of the collection of content items, one or more content items that are unread by the user. In addition, the content processing module 106 can be configured to facilitate sorting, in a chronological order, the one or more content items unread by the user to produce a sorted set of one or more unread content items. More details regarding the content processing module 106 will be provided below with reference to FIG. 2A.

Moreover, the interface module 108 can be configured to facilitate providing an interface to the user for accessing the sorted set of one or more unread content items. In some embodiments, the interface can be navigable via the social networking system. In one example, the social networking system can present a feed, such as a newsfeed, which provides various content items from a multitude of entities. In this example, the interface module 108 can provide the interface for accessing the sorted set of unread content items vertically above or pinned above the feed within the social networking system. Additionally, in this example, the feed can provide content items that are either read or unread by the user and posted by various entities, whereas the interface only provides content items that are posted by the specified set of entities and unread by the user.

In another example, the feed can be provided by default and/or when the user clicks on, taps on, or activates, etc., a feed button in a social networking system navigation pane or menu. In this example, the interface can be provided when the user clicks on, taps on, or activates, etc., an unread content button and/or a button associated with the specified set of entities in the social networking system navigation pane or menu.

In a further example, the feed and the sorted set of unread content items can both be presented in the interface. In this example, there can be one or more indications to inform the user that the sorted set of unread content items is separate from the feed, such as by pinning the sorted set vertically above the feed and/or by providing visualizations or text to indicate that the content items in the sorted set are unread. It is contemplated that all examples herein are provided for illustrative purposes and that there can be many variations or other possibilities.

Furthermore, in some implementations, the unread content module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the unread content module 102. For instance, the at least one data store 110 can store information associated with content items and/or users (or entities). It is contemplated that there can be many variations or other possibilities.

In one example, the user of the social networking system can specify or select a list or set of friends from whom provided content would be of interest or relevant to the user. The specified entity module 104 can acquire the specified list or set of the user's friends. The content processing module 106 can detect that content items, such as images, videos, audio, and/or text, etc., have been posted or provided by one or more friends in the specified list or set. In this example, at least some of these content items can be presented to the user via a feed, such as the user's newsfeed, within the social networking system. Some of the content items can thus have been read (i.e., viewed, seen, accessed, played, interacted with, and/or engaged with, etc.) by the user. The content processing module 106 can identify those content items that have not yet been read by the user (i.e., unread content items). The content processing module 106 can sort the unread content items to result in a sorted set of unread content items. The interface module 108 can provide an interface to the user for accessing the sorted set of unread content items.

In some cases, the content processing module 106 can detect at least one new content item provided by at least one entity in the specified set. Continuing with the example, subsequent to determining that certain content items posted by friends in the specified list are unread by the user, another content item can be newly posted by a friend in the specified list. The content processing module 106 can further determine or recognize that the at least one new content item provided by the at least one entity (e.g., the other content item newly posted by the friend) is unread by the user. Accordingly, the content processing module 106 can incorporate the at least one new content item unread by the user into the sorted set based on the chronological order. The interface module 108 can update the interface for accessing the sorted set incorporating the at least one new content item unread by the user.

Furthermore, in some instances, the content processing module 106 can determine that at least one content item in the sorted set is read by the user. Continuing with the previous example, if the user reads a particular content item included in the sorted set of unread content items, such as by reading the particular content item (or an instance/copy thereof) via the interface and/or via the feed within the social networking system, the particular content item is considered to be read (or no longer unread). As a result, the content processing module 106 can remove, from the sorted set, the at least one content item (e.g., the particular content item) read by the user. The interface module 108 can also update the interface for accessing the sorted set without the at least one content item read by the user. Again, it should be understood that all examples herein are provided for illustrative purposes and that there can be many variations or other possibilities.

Figure 2A:
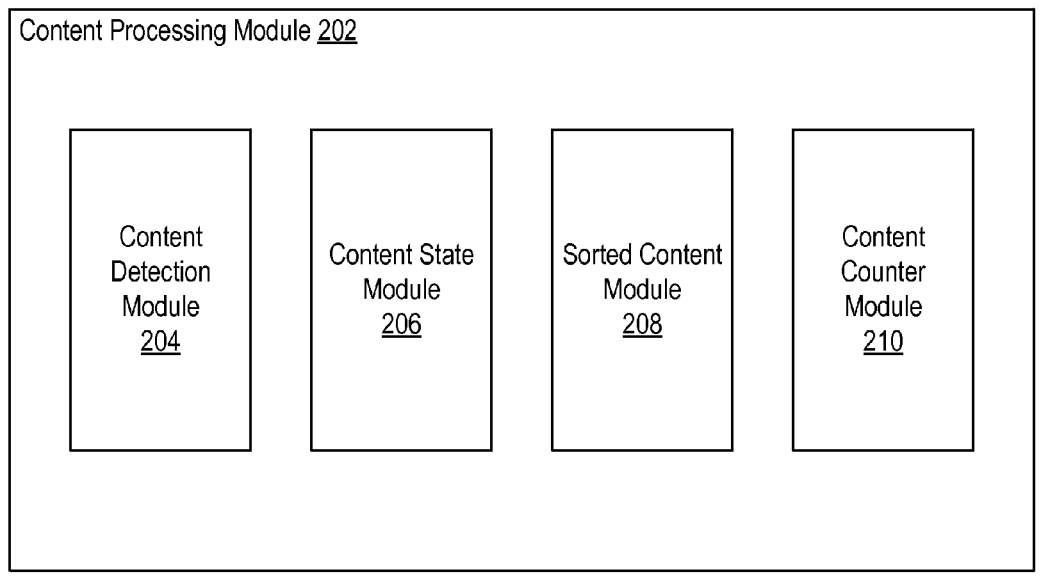
FIG. 2A illustrates an example content processing module configured to facilitate providing unread content items from specified entities, according to an embodiment of the present disclosure.

FIG. 2A illustrates an example content processing module 202 configured to facilitate providing unread content items from specified entities, according to an embodiment of the present disclosure. In some embodiments, the content processing module 106 of FIG. 1 can be implemented as the example content processing module 202. As shown in FIG. 2A, the content processing module 202 can include a content detection module 204, a content state module 206, a sorted content module 208, and a content counter module 210.

As discussed, the content processing module 202 can be configured to perform various tasks or operations associated with handling or otherwise processing content items. In some implementations, the content processing module 202 can utilize the content detection module 204 to facilitate detecting a collection of content items provided by a specified set of one or more entities. For instance, when an entity in the specified set posts, publishes, shares, or otherwise causes a particular content item to be provided, then content detection module 204 can detect that the particular content item has be provided by the entity.

Moreover, the content processing module 202 can utilize the content state module 206 to facilitate identifying, out of the collection of content items, one or more content items that are unread by the user. For example, out of the various images, videos, audio, text, links, articles, and/or other posts provided by the specified set of entities, the content state module 206 can determine a read-or-unread state for each of the images, videos, audio, text, links, articles, and/or other posts. The content state module 206 can identify which content items are still unread (i.e., not yet read, new, not yet viewed, not yet seen, not yet accessed, not yet played, not yet interacted with, not yet engaged with, etc.) by the user. The content state module 206 will be discussed in more detail with reference to FIG. 2B.

Furthermore, the content processing module 202 can utilize the sorted content module 208 to facilitate sorting, in a chronological order, the one or more content items unread by the user in order to produce a sorted set of one or more unread content items. In some implementations, the sorted content module 208 can order each of the one or more content items unread by the user based on when each unread content item was posted or provided by one of the specified entities. In one example, the sorted content module 208 can cause the chronological order to correspond to a most-recent-to-least-recent order, such that the most recently posted unread content items can be presented above the other less recently posted unread content items in an interface for accessing the sorted set. In another example, the sorted content module 208 can cause the chronological order to correspond to a least-recent-to-most-recent order, such that the least recently posted unread content items are presented above the other more recently posted unread content items in the interface.

In some embodiments, one or more undesirable unread content items can be filtered out from the sorted set prior to providing the interface to the user for accessing the sorted set. For example, spam content can be considered undesirable and thus can be filtered out from the sorted set. In another example, content that fails to satisfy a minimum ranking score, such as a relevancy threshold with respect to the user, can be considered undesirable and thus can be filtered out from the sorted set. In some cases, subsequent to filtering out the one or more undesirable unread content items, the sorted set can include at least one of an image, a video, an audio, a link, an article, a status update, or text explicitly posted by an entity in the specified set. Explicitly posted content can, for instance, correspond to content that is provided based on a user-intended action to provide or publish the content, such as a post action or a share action.

In addition, the content counter module 210 can be configured to facilitate determining at least one of an approximation or an exact value for a quantity of the one or more unread content items in the sorted set. The content counter module 210 can also be configured to provide a counter indicating the approximation and/or the exact value. In one example, if there are seven unread content items, the content counter module 210 can provide a counter indicating that there are seven unread content items. In another example, the content counter module 210 can provide a counter indicating that there are at least five unread content items. In a further example, the content counter module 210 can provide a counter indicating that there are approximately five unread content items. As discussed above, it should be understood that the disclosed technology can have many variations or other possibilities.

Figure 2B:
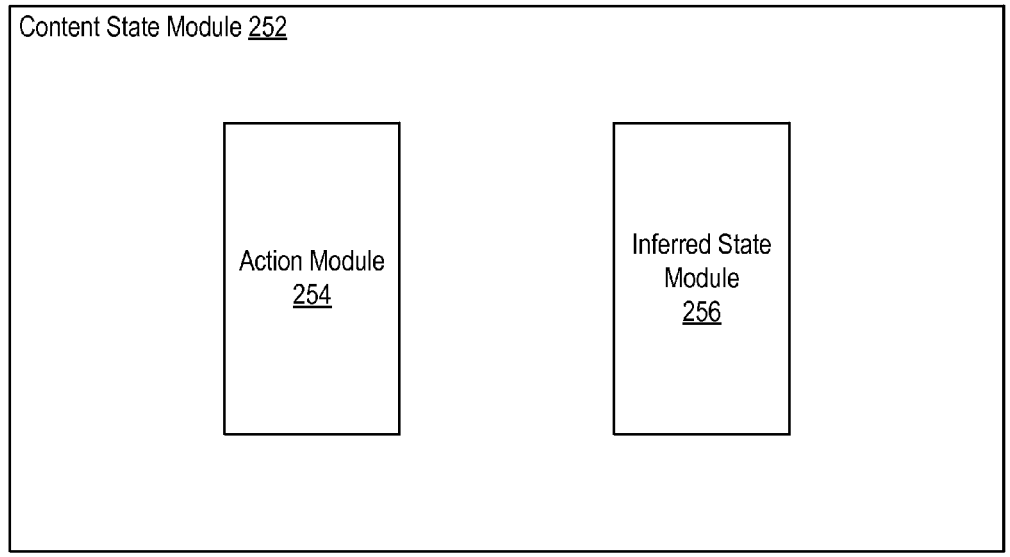
FIG. 2B illustrates an example content state module configured to facilitate providing unread content items from specified entities, according to an embodiment of the present disclosure.

FIG. 2B illustrates an example content state module 252 configured to facilitate providing unread content items from specified entities, according to an embodiment of the present disclosure. In some embodiments, the content state module 206 of FIG. 2A can be implemented as the example content state module 252. As shown in FIG. 2B, the content state module 252 can include an action module 254 and an inferred state module 256.

As discussed above, the content state module 252 can be configured to facilitate identifying, out of the collection of content items provided by the specified set of entities, one or more content items that are unread by the user. The content state module 252 can also be configured to determine or identify new content items provided by the specified set that are unread by the user. Content items unread by the user can, for instance, correspond to content items that are unviewed by the user, unseen by the user, yet to be accessed by the user, yet to be played by the user, yet to be interacted with by the user, and/or yet to be engaged with by the user, etc. In some embodiments, content can no longer be considered unread by the user when the content is read (i.e., viewed, seen, accessed, played, interacted with, and/or engaged with, etc.) by the user via the interface. In some implementations, content can no longer be considered unread by the user when the content is read by the user via the interface and/or via a feed of the social networking system (e.g., the user's social networking system newsfeed).

In some embodiments, the content state module 252 can further be configured to facilitate determining that at least one content item in the sorted set of unread content items is read by the user. In some cases, determining that the at least one content item in the sorted set is read by the user can include detecting a trigger event. The trigger event can, for instance, be associated with an action performed by the user with respect to the at least one content item and/or a minimum amount of time that has elapsed during which at least a threshold portion of the at least one content item is presented to the user.

The content state module 252 can utilize the action module 254 to detect the action performed by the user with respect to the at least one content item. In some cases, the action performed by the user with respect to the at least one content item can include at least one of a like, a comment, a share, a save, a hide, a delete, a tag, an edit, a click, a tap, a mouse action, or a mark-as-read action. For example, if the action module 254 detects that the user has performed a mouse hover with respect to a particular status update content item, then the particular status update content item can be considered read by the user. In another example, an input element can be provided for each content item in the sorted set. The input element can enable the user to label, denote, or otherwise mark a content item as being read.

Furthermore, the content state module 252 can utilize the inferred state module 256 to determine or infer the state of the at least one content item as being read or unread. In one example, if 80% of a particular image content item is presented on a display element of the user's computing device (or system) for at least 15 seconds, then the inferred state module 256 can infer that the particular image content item has been read by the user. As disused previously, all examples herein are provided for illustrative purposes and that there can be many variations or other possibilities.

Figure 3:
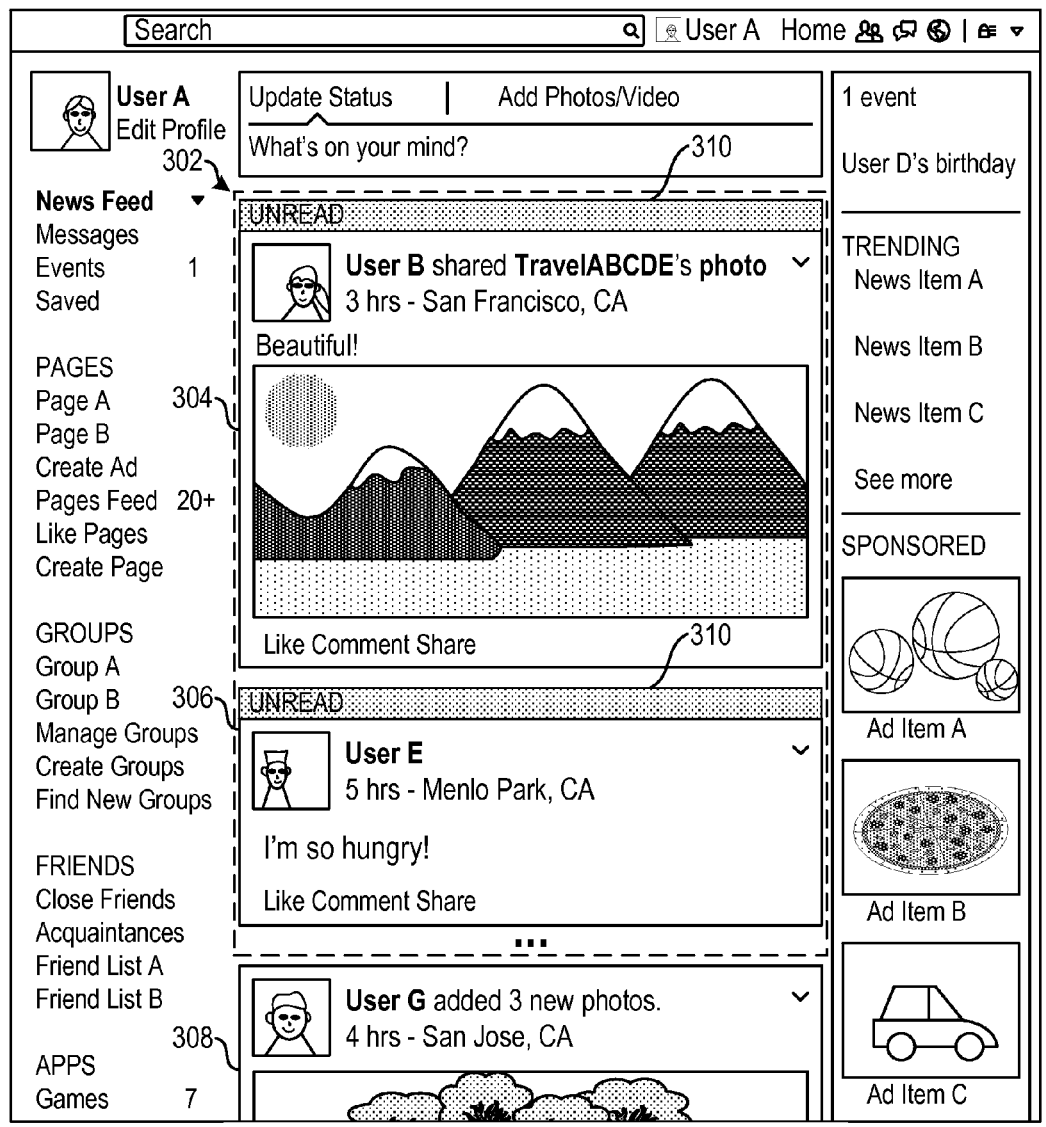
FIG. 3 illustrates an example scenario associated with providing unread content items from specified entities, according to an embodiment of the present disclosure.

FIG. 3 illustrates an example scenario 300 associated with providing unread content items from specified entities, according to an embodiment of the present disclosure. The example scenario 300 can show an interface 302 for accessing a sorted set of one or more unread content items. In this example scenario 300, the interface 302 is provided to a user, User A, for accessing unread content items provided or posted by User A's Close Friends. In this example, User A's Close Friends are User B, User C, and User E.

As shown in FIG. 3, the interface 302 can correspond to an interface portion within the social networking system. The interface 302 can provide User A with access to content items posted by User A's Close Friends and unread by User A. In this example, a shared post 304 from User B can be provided via the interface 302. Moreover, the interface 302 can also provide a status update post 306 from User E. As such, the likelihood that User A will miss content posted by User A's Close Friends can be decreased.

Moreover, as shown, content items in the newsfeed of the social networking system, such as an image post from User G, can be presented in another interface portion below the interface (or interface portion) 302. In some cases, one or more indications (e.g., visualizations, text, etc.) 310 can be provided to help User A recognize unread content from Close Friends as being separate or distinguishable from content provided via the newsfeed. In this example scenario 300, each unread content item can be indicated as such by one or more indications 310 including a colored bar and an "UNREAD" label presented in association with the unread content. In some cases, a colored border, boundary, or glow, etc., around the unread content can be used as the one or more indications. In some instances, when the unread content has been read, the one or more indications can disappear (e.g., fade). It is contemplated that many variations are possible.

Figure 4:
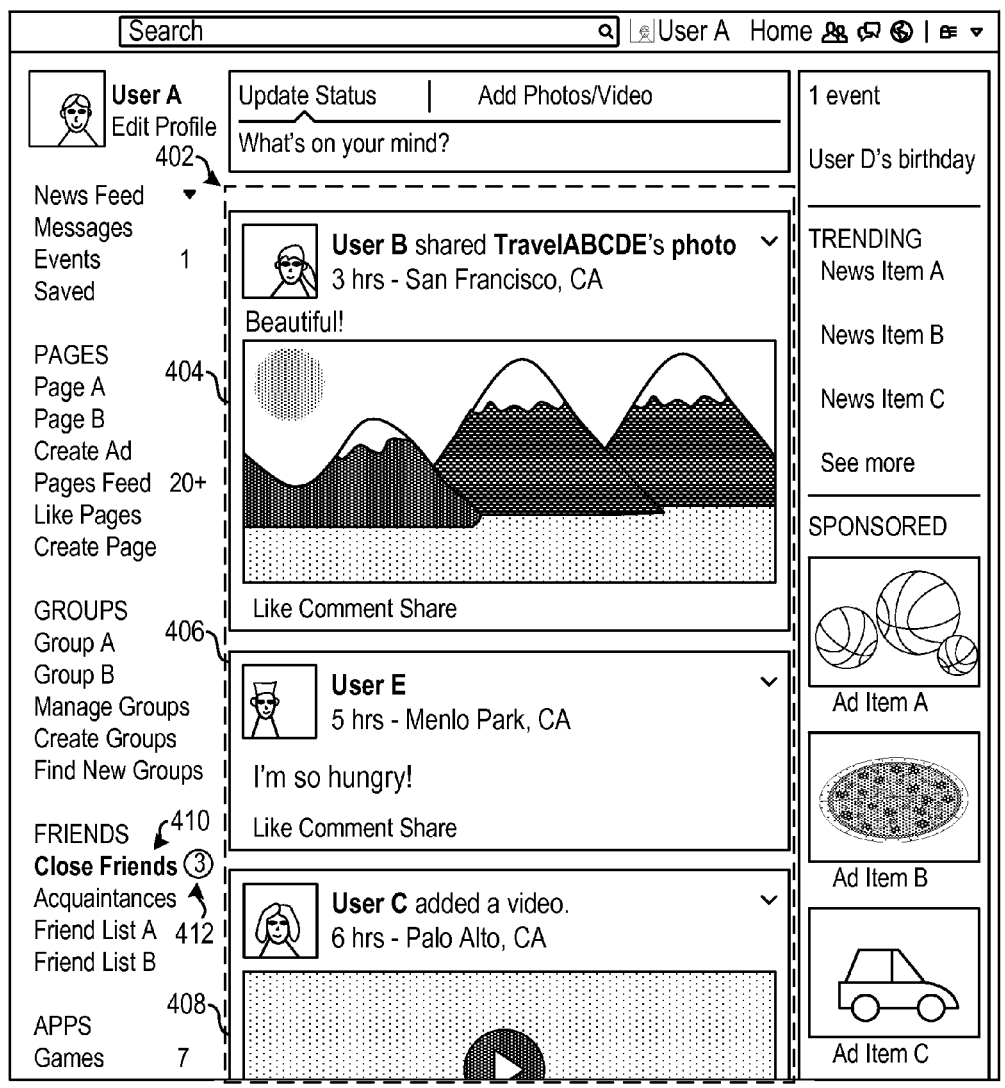
FIG. 4 illustrates an example scenario associated with providing unread content items from specified entities, according to an embodiment of the present disclosure.

FIG. 4 illustrates an example scenario 400 associated with providing unread content items from specified entities, according to an embodiment of the present disclosure. The example scenario 400 can show an interface 402 for accessing a sorted set of one or more unread content items. In this example scenario 400, the interface 402 is provided to a user, User A, for accessing unread content items provided by User A's Close Friends, such as posts 404, 406, and 408 respectively posted by User B, User E, and User C.

In this example, the interface 402 for accessing unread content from User A's Close Friends is separate from User A's newsfeed within the social networking system. The interface 402 for accessing unread content from User A's Close Friends is navigable, accessible, and/or presented when the user clicks on, taps on, selects, or otherwise interacts with a Close Friends element, tab, or button 410. Also, as shown in this example scenario 400, a counter 412 based on a quantity of unread content from User A's Close Friends can be provided. Again, many variations are possible.

Figure 5:
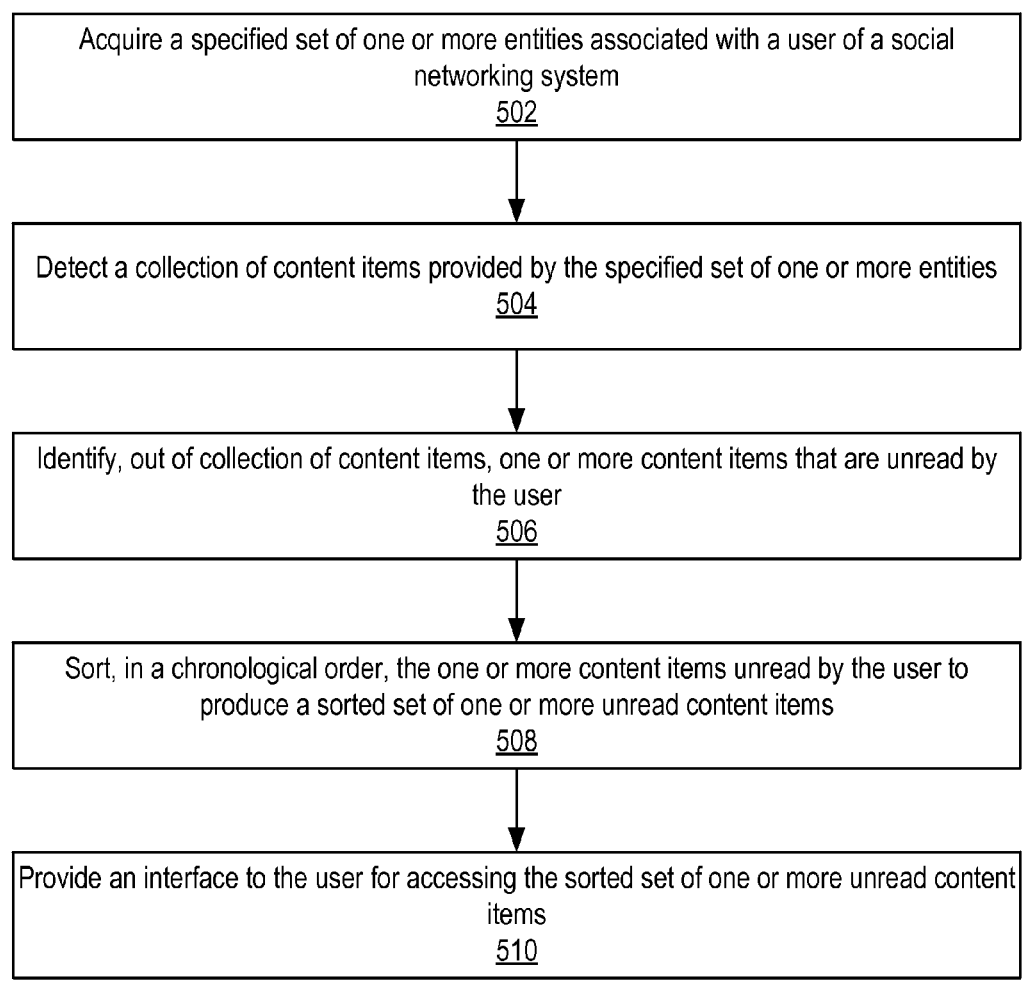
FIG. 5 illustrates an example method associated with providing unread content items from specified entities, according to an embodiment of the present disclosure.

FIG. 5 illustrates an example method 500 associated with providing unread content items from specified entities, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can acquire a specified set of one or more entities associated with a user of a social networking system. At block 504, the example method 500 can detect a collection of content items provided by the specified set of one or more entities. At block 506, the example method 500 can identify, out of the collection of content items, one or more content items that are unread by the user. At block 508, the example method 500 can sort, in a chronological order, the one or more content items unread by the user to produce a sorted set of one or more unread content items. At block 510, the example method 500 can provide an interface to the user for accessing the sorted set of one or more unread content items.

Figure 6A:
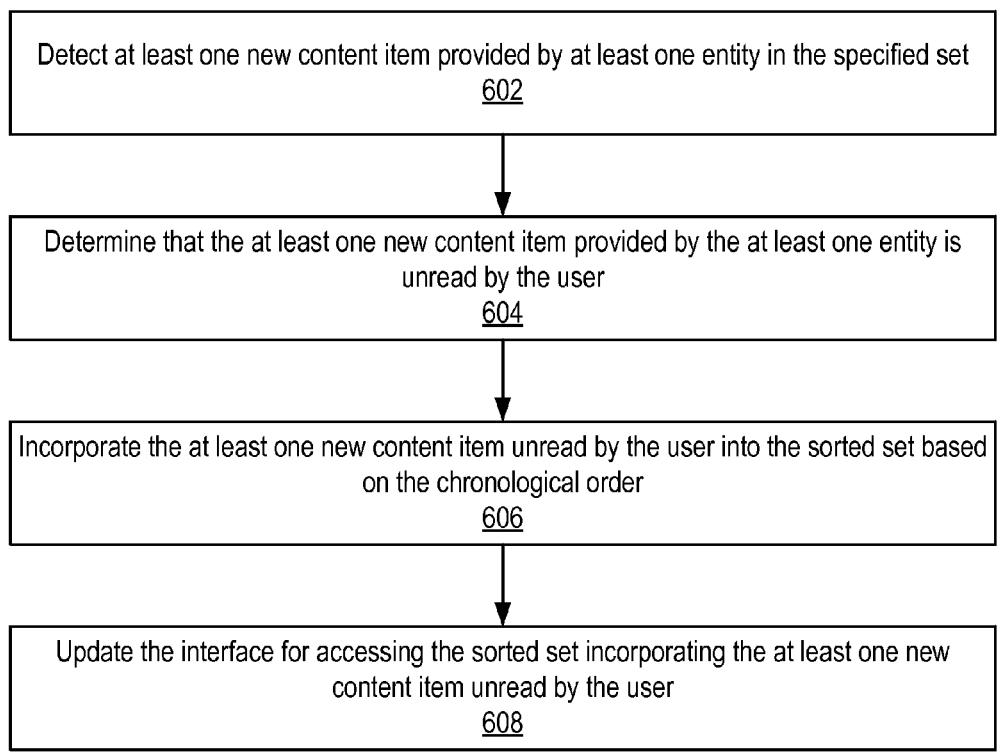
FIG. 6A illustrates an example method associated with providing unread content items from specified entities, according to an embodiment of the present disclosure.

FIG. 6A illustrates an example method 600 associated with providing unread content items from specified entities, according to an embodiment of the present disclosure. As discussed above, it should be appreciated that there can be additional, fewer, or alternative steps performed in similar or alternative orders, or in parallel, within the scope of the various embodiments unless otherwise stated.

At block 602, the example method 600 can detect at least one new content item provided by at least one entity in the specified set. At block 604, the example method 600 can determine that the at least one new content item provided by the at least one entity is unread by the user. At block 606, the example method 600 can incorporate the at least one new content item unread by the user into the sorted set based on the chronological order. At block 608, the example method 600 can update the interface for accessing the sorted set incorporating the at least one new content item unread by the user.

FIG. 6B illustrates an example method 650 associated with providing unread content items from specified entities, according to an embodiment of the present disclosure. Again, it should be appreciated that there can be additional, fewer, or alternative steps performed in similar or alternative orders, or in parallel, within the scope of the various embodiments unless otherwise stated.

At block 652, the example method 650 can determine that at least one content item in the sorted set is read by the user. At block 654, the example method 650 can remove, from the sorted set, the at least one content item read by the user. At block 656, the example method 650 can update the interface for accessing the sorted set without the at least one content item read by the user.

It is contemplated that there can be many other uses, applications, features, possibilities, and/or variations associated with the various embodiments of the present disclosure. For example, in some instances, various content items can be pulled or fetched (rather than pushed) and their read/unread states can be determined at a later time. Moreover, in another example, there can be client-side logic that records, stores, and/or maintains a local list specifying which content items have been read or unread. The local list can be used to update one or more servers, such as to invalidate what the one or more servers recognized as being read/unread. In another example, users can, in some cases, choose whether or not to opt-in to utilize the disclosed technology. The disclosed technology can also ensure that various privacy settings and preferences are maintained and can prevent private information from being divulged. In a further example, various embodiments of the present disclosure can learn, improve, and/or be refined over time. In some instances, the disclosed technology can be utilized and/or synchronized among multiple devices and/or platforms.

Social Networking System—Example Implementation

Figure 7:
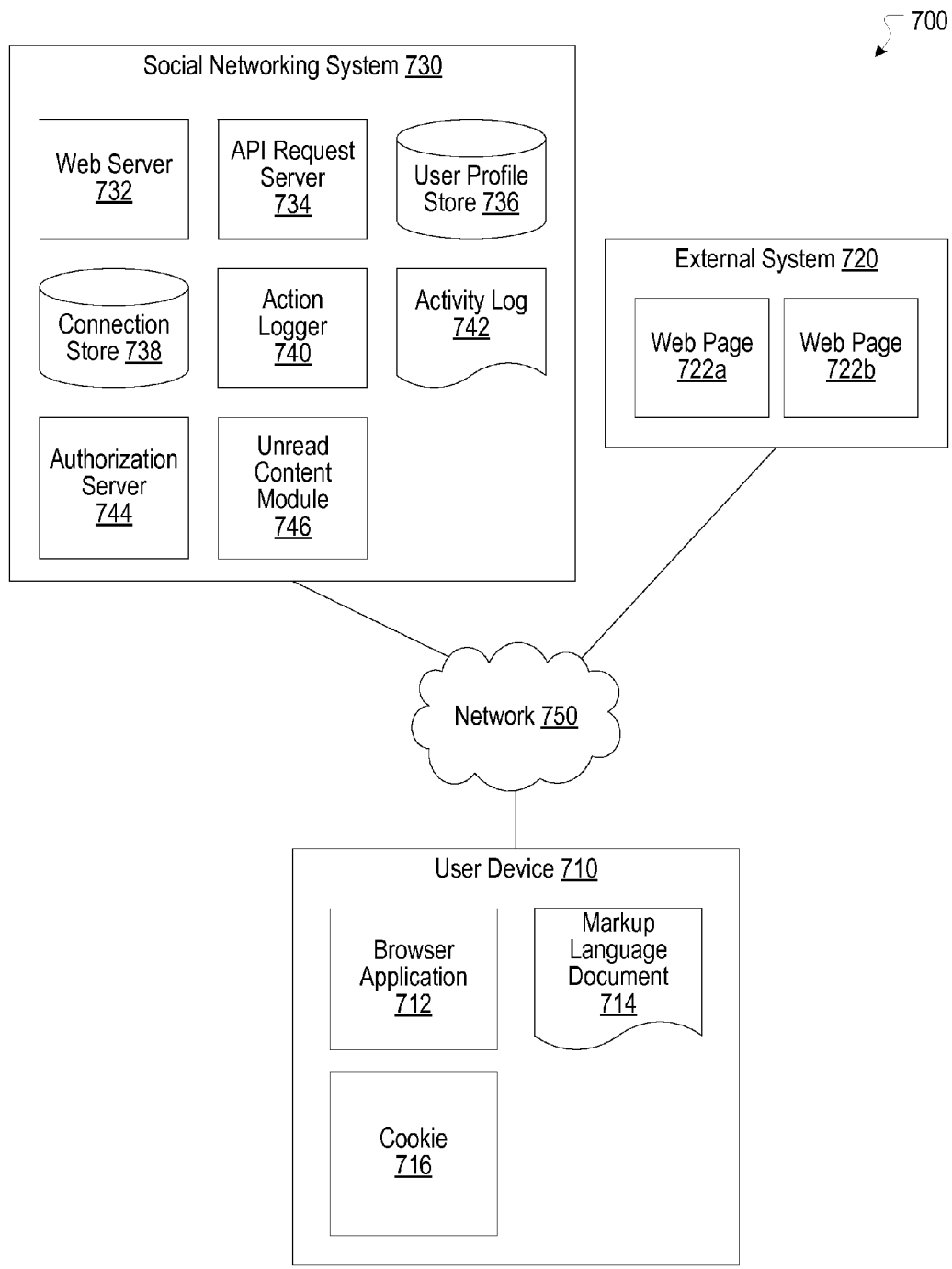
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include an unread content module 746. The unread content module 746 can, for example, be implemented as the unread content module 102 of FIG. 1. As discussed previously, it should be appreciated that there can be many variations or other possibilities. For example, in some instances, the unread content module 746 (or at least a portion thereof) can be included in the user device 710. Other features of the unread content module 746 are discussed herein in connection with the unread content module 102.

Hardware Implementation

Figure 8:
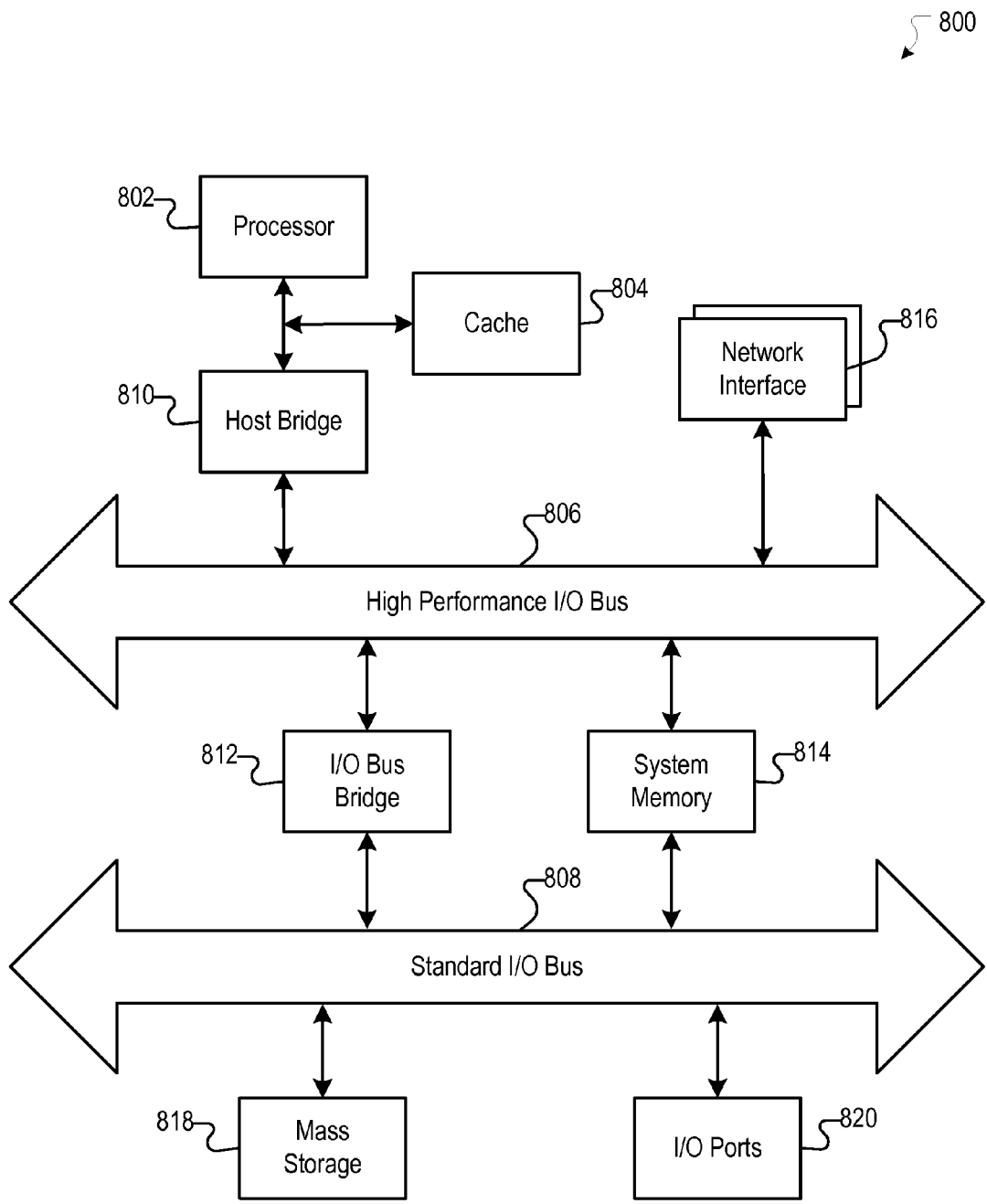
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, a first set of one or more entities associated with a user of a social networking system;
   detecting, by the computing system, a first collection of content items provided by the first set of one or more entities;
   generating, by the computing system, a social affinity value for each entity in the first set of one or more entities based on social data between the user and entity;
   providing, to the user, by the computing system, a newsfeed for accessing the first collection of content items;
   identifying, by the computing system, a second set of one or more entities associated with the user of the social networking system, wherein the second set is a subset of the first set and wherein each entity of the second set has at least a threshold level of social affinity to the user;
   automatically identifying, by the computing system, from the newsfeed previously provided to the user, a subset of content items that are unread by the user in the newsfeed and provided by the second set of one or more entities;
   sorting, by the computing system, in a chronological order, the subset of content items to produce a sorted set of the subset of content items; and
   providing, by the computing system, an interface to the user for accessing the sorted set of the subset of content items.

2. The computer-implemented method of claim 1, further comprising:
   detecting at least one new content item provided by at least one entity in the second set of one or more entities;
   determining that the at least one new content item provided by the at least one entity is unread by the user;
   incorporating the at least one new content item unread by the user into the sorted set based on the chronological order; and
   updating the interface for accessing the sorted set incorporating the at least one new content item unread by the user.

3. The computer-implemented method of claim 1, further comprising:
   determining that at least one content item in the sorted set is read by the user;
   removing, from the sorted set, the at least one content item read by the user; and
   updating the interface for accessing the sorted set without the at least one content item read by the user.

4. The computer-implemented method of claim 3, wherein, prior to determining that the at least one content item in the sorted set is read by the user, the at least one content item is presented via at least one of the interface or the newsfeed of the social networking system.

5. The computer-implemented method of claim 3, wherein determining that the at least one content item in the sorted set is read by the user includes detecting a minimum amount of time that has elapsed during which at least a threshold portion of the at least one content item is presented to the user without an express user interaction with the content item, the threshold portion being less than all of a content item.

6. The computer-implemented method of claim 1, further comprising:
   filtering out one or more undesirable unread content items from the sorted set prior to providing the interface to the user for accessing the sorted set.

7. The computer-implemented method of claim 6, wherein, subsequent to filtering out the one or more undesirable unread content items, the sorted set includes at least one of an image, a video, an audio, a link, an article, a status update, or text explicitly posted by an entity in the second set of one or more entities.

8. The computer-implemented method of claim 1, further comprising:
   determining at least one of an approximation or an exact value for a quantity of the subset of content items in the sorted set; and
   providing a counter indicating the at least one of the approximation or the exact value.

9. The computer-implemented method of claim 1, wherein the second set of one or more entities includes a set of close friends of the user or a list of entities manually defined by the user.

10. A system comprising:
    at least one processor; and
    a memory storing instructions that, when executed by the at least one processor, cause the system to perform:
    acquiring a first set of one or more entities associated with a user of a social networking system;
    detecting a first collection of content items provided by the first set of one or more entities;
    generating a social affinity value for each entity of the first set of one or more entities based on the social data between the user and entity;
    providing, by the computing system, a newsfeed for accessing the first collection of content items;
    identifying a second set of one or more entities associated with the user of the social networking system, wherein the second set is a subset of the first set and wherein each entity of the second set has at least a threshold level of social affinity to the user;
    automatically identifying, from the newsfeed previously provided to the user, a subset of content items that are unread by the user in the newsfeed and provided by the second set of one or more entities;
    sorting in a chronological order, the subset of content items to produce a sorted set of the subset of content items; and
    providing an interface to the user for accessing the sorted set of the subset of content items.

11. The system of claim 10, wherein the instructions cause the system to further perform:
    detecting at least one new content item provided by at least one entity in the second set of one or more entities;
    determining that the at least one new content item provided by the at least one entity is unread by the user;
    incorporating the at least one new content item unread by the user into the sorted set based on the chronological order; and
    updating the interface for accessing the sorted set incorporating the at least one new content item unread by the user.

12. The system of claim 10, wherein the instructions cause the system to further perform:
   determining that at least one content item in the sorted set is read by the user;
   removing, from the sorted set, the at least one content item read by the user; and
   updating the interface for accessing the sorted set without the at least one content item read by the user.

13. The system of claim 12, wherein, prior to determining that the at least one content item in the sorted set is read by the user, the at least one content item is presented via at least one of the interface or the newsfeed of the social networking system.

14. The system of claim 12, wherein determining that the at least one content item in the sorted set is read by the user includes detecting, a minimum amount of time that has elapsed during which at least a threshold portion of the at least one content item is presented to the user without an express user interaction with the content item, the threshold portion being less than all of a content item.

15. A non-transitory computer-readable storage medium including instructions that, when executed by at least one processor of a computing system, cause the computing system to perform:
   acquiring a first set of one or more entities associated with a user of a social networking system;
   detecting a first collection of content items provided by the first set of one or more entities;
   generating a social affinity value for each entity of the first set of one or more entities based on the social data between the user and entity;
   providing, by the computing system, a newsfeed for accessing the first collection of content items;
   identifying a second set of one or more entities associated with the user of the social networking system, wherein the second set is a subset of the first set and wherein each entity of the second set has at least a threshold level of social affinity to the user;
   automatically identifying, from the newsfeed previously provided to the user, a subset of content items that are unread by the user in the newsfeed and provided by the second set of one or more entities;
   sorting in a chronological order, the subset of content items to produce a sorted set of the second subset of content items; and
   providing an interface to the user for accessing the sorted set of the subset of content items.

16. The non-transitory computer-readable storage medium of claim 15, wherein the instructions cause the system to further perform:
   detecting at least one new content item provided by at least one entity in the second set of one or more entities;
   determining that the at least one new content item provided by the at least one entity is unread by the user;
   incorporating the at least one new content item unread by the user into the sorted set based on the chronological order; and
   updating the interface for accessing the sorted set incorporating the at least one new content item unread by the user.

17. The non-transitory computer-readable storage medium of claim 15, wherein
   the instructions cause the system to further perform:
   determining that at least one content item in the sorted set is read by the user;
   removing, from the sorted set, the at least one content item read by the user; and
   updating the interface for accessing the sorted set without the at least one content item read by the user.

18. The non-transitory computer-readable storage medium of claim 17, wherein, prior to determining that the at least one content item in the sorted set is read by the user, the at least one content item is presented via at least one of the interface or the newsfeed of the social networking system.

19. The non-transitory computer-readable storage medium of claim 17, wherein determining that the at least one content item in the sorted set is read by the user includes detecting a minimum amount of time that has elapsed during which at least a threshold portion of the at least one content item is presented to the user without an express user interaction with the content item, the threshold portion being less than all of a content item.

20. The computer-implemented method of claim 1, wherein providing the interface to the user for accessing the sorted set of the subset of content items further comprises providing the interface vertically above the newsfeed provided to the user for accessing the first collection of content items.

* * * * *